United States Patent [19]

Itabashi et al.

[11] Patent Number: 5,475,522
[45] Date of Patent: Dec. 12, 1995

[54] OPTICAL SCANNER

[75] Inventors: Akihisa Itabashi, Mitaka; Hiromichi Atsuumi, Yokohama, both of Japan

[73] Assignee: Ricoh Company, Ltd., Tokyo, Japan

[21] Appl. No.: 418,157

[22] Filed: Apr. 6, 1995

Related U.S. Application Data

[63] Continuation of Ser. No. 95,426, Jul. 23, 1993, abandoned.

[30]    Foreign Application Priority Data

Jul. 24, 1992 [JP] Japan .................................. 4-198859

[51] Int. Cl.$^6$ .................................................. G02B 26/08
[52] U.S. Cl. ........................ 359/208; 359/212; 359/216; 359/823
[58] Field of Search ........................... 359/205, 207–210, 359/212–214, 216–219, 813–814, 822–824, 868–869; 250/235, 236; 346/108, 160; 348/202, 203; 358/474, 481, 296, 494; 347/129, 137, 225, 258–261

[56]          References Cited

U.S. PATENT DOCUMENTS

| | | | |
|---|---|---|---|
| 4,852,957 | 8/1989 | Wakimoto et al. | 359/208 |
| 5,054,866 | 10/1991 | Tomita et al. | 359/210 |
| 5,162,938 | 11/1992 | Iima et al. | 359/207 |
| 5,220,449 | 6/1993 | Kuroda | 359/208 |
| 5,233,454 | 8/1993 | Sakuma et al. | 359/218 |
| 5,249,073 | 9/1993 | Takizawa et al. | 359/205 |
| 5,257,125 | 10/1993 | Maeda | 359/196 |
| 5,331,343 | 7/1994 | Ouo et al. | 359/207 |

FOREIGN PATENT DOCUMENTS

| | | | |
|---|---|---|---|
| 62-275216 | 11/1987 | Japan | 359/208 |
| 2-15231 | 1/1990 | Japan | 359/208 |

OTHER PUBLICATIONS

Matsuda et al, "Laser Printer Scanning System with a Parabolic Mirror", Applied Optics/vol. 17, No. 6, Mar. 15, 1978, pp. 878–884.

*Primary Examiner*—James Phan
*Attorney, Agent, or Firm*—Oblon, Spivak, McClelland, Maier & Neustadt

[57]           ABSTRACT

An optical scanner has a light source device for emitting a light beam for performing an optical scanning operation; a cylindrical lens system for converging the light beam from the light source device only in a cross scan-corresponding direction and focusing and forming the light beam as a linear image extending in a main scan-corresponding direction; an optical deflector for reflecting the light beam from this cylindrical lens system on a deflecting reflecting face and deflecting this light beam at an equal angular velocity; an image forming mirror system for converging the deflected light beam as a light spot on a scanned face and performing the optical scanning operation at an equal speed by using the light spot; and an adjusting mechanism for displacing and adjusting a position of the cylindrical lens system in an optical axis direction thereof.

5 Claims, 10 Drawing Sheets

FIELD
CURVATURE

SCANNING
CHARACTERISTCS(%)

Fig. 9A $\theta = 50.0°$ $\theta = -50.0°$

FIELD CURVATURE

Fig. 9B $\theta = 50.0°$ $\theta = -50.0°$

SCANNING CHARACTERISTICS (%)

Fig. 10A $\theta = 50.0°$ $\theta = -50.0°$ $-0.1f_M$  $0.1f_M$

FIELD CURVATURE

Fig. 10B $\theta = 50.0°$ $\theta = -50.0°$ $-2.000$  $2.000$

SCANNING CHARACTERISTICS(%)

Fig. 11A $\theta = 50.0°$ $\theta = -50.0°$

-0.03 fM    -0.03 fM

FIELD CURVATURE

Fig. 11B $\theta = 50.0°$ $\theta = -50.0°$

-1.000    1.000

SCANNING CHARACTERISTICS (%)

OPTICAL SCANNER

This application is a continuation of application Ser. No. 08/095,426, filed on Jul. 23, 1993, now abandoned.

BACKGROUND OF THE INVENTION

1. Field of the Invention

The present invention relates to an optical scanner using an image forming mirror instead of an fθ lens in a second image forming system.

2. Description of the Related Art

In various kinds of general known optical scanners relative to an optical printer, etc., a light beam deflected at an equal angular velocity is converged as a light spot on a scanned face to scan the scanned face. An fθ lens is generally known as an optical system for converging the deflected light beam as the light spot on the scanned face and performing an optical scanning operation using the light spot at an equal speed. However, an image forming mirror system having a linearity correcting function is recently used instead of the fθ lens as a proposal. For example, such a proposal is shown in Japanese Patent Application Laying Open (KOKAI) No. 1-0200221.

In a recent optical scanner, a high density recording is required to improve the quality of a written image. To realize this high density recording, it is necessary that no diameter of a light spot for scanning the scanned face is greatly changed as the height of an image is increased. The diameter of the light spot is influenced by loci of an image forming point in a main scan-corresponding direction and a cross scan-corresponding direction, i.e., field curvatures in these directions in an image forming system for converging the deflected light beam as a light spot on the scanned face. The main scan-corresponding direction is set to a direction corresponding and parallel to a main scanning direction on a virtual optical path on which an optical path from a light source to the scanned face is linearly developed. The cross scan-corresponding direction is set to a direction corresponding and parallel to a cross scanning direction on this virtual optical path.

It is sufficient to set the field curvatures of the image forming system to zero in both the main scan-corresponding direction and the cross scan-corresponding direction so as to restrain the change in diameter of the light spot. However, it is practically impossible to set the field curvatures of the image forming system to zero. In reality, the field curvatures are considerably caused in the main scan-corresponding direction and the cross scan-corresponding direction. The change in diameter of the light spot caused by the field curvature in the main scan-corresponding direction can be corrected by electrically controlling a time for writing one dot to such an extent that no practical problems about this change are caused. Accordingly, allowance is relatively high with respect to the field curvature in the main scan-corresponding direction.

However, the change in diameter of the light spot in the cross scan-corresponding direction cannot be electrically corrected in this way. Accordingly, when the field curvature in the cross scan-corresponding direction is large, the diameter of the light spot in the cross scan-corresponding direction is greatly changed in accordance with the image height. Therefore, in general, the above image forming system is designed such that the field curvature in the cross scan-corresponding direction is reduced as much as possible. However, when the image forming system is really manufactured, an error in manufacture of the image forming system is inevitably caused to a certain extent. Further, when the image forming system is assembled into a body of the optical scanner, an error in assembly of the image forming system is inevitably caused. When there are such errors in manufacture and assembly of the image forming system, an image forming position of the deflected light beam in each of the main and cross scan-corresponding directions is shifted from a designed position. Therefore, the diameter of the light spot formed on the scanned face in each of the main and cross scan-corresponding directions is different from a designed diameter.

The error in diameter of the light spot based on the errors in manufacture and assembly of the image forming system can be corrected by electrically controlling the above time for writing one dot with respect to the main scan-corresponding direction. However, it is difficult to electrically correct the error in diameter of the light spot with respect to the cross scan-corresponding direction.

Further, when there is a so-called inclination of a deflecting face in an optical deflector for deflecting the light beam at an equal angular velocity, the position of a main scanning line scanned by the light spot is changed in the cross scanning direction so that a so-called jitter is caused. The above problems about the change in diameter of the light spot and the generation of jitter are also caused when the above image forming mirror system is used as an image forming system.

SUMMARY OF THE INVENTION

It is therefore an object of the present invention to provide a novel optical scanner using an image forming mirror system in which an error in diameter of a light spot in a cross scan-corresponding direction can be effectively reduced on the basis of errors in manufacture and assembly of the image forming system.

Another object of the present invention is to provide a novel optical scanner using an image forming mirror in which an error in diameter of a light spot is effectively reduced and it is possible to effectively prevent jitter from being caused by the inclination of a deflecting face of an optical deflector.

In a first structure of the present invention, the above objects can be achieved by an optical scanner comprising a light source device for emitting a light beam for performing an optical scanning operation; a cylindrical lens system for converging the light beam from the light source device only in a cross scan-corresponding direction and focusing and forming the light beam as a linear image extending in a main scan-corresponding direction; an optical deflector for reflecting the light beam from this cylindrical lens system on a deflecting reflecting face and deflecting this light beam at an equal angular velocity; an image forming mirror system for converging the deflected light beam as a light spot on a scanned face and performing the optical scanning operation at an equal speed by using the light spot; and an adjusting mechanism for displacing and adjusting a position of the cylindrical lens system in an optical axis direction thereof.

In the first structure of the present invention, the linear image extending in the main scan-corresponding direction and formed by the cylindrical lens system may be located in principle in an arbitrary position in the region of an optical path from the cylindrical lens system to the image forming mirror system.

The optical deflector can be constructed by a rotary polygon mirror, a pyramidal mirror, a rotary signal mirror, etc. However, there is a case in which no optical scanner of the present invention has a function for correcting an inclination of the deflecting reflecting face. In such a case, it is preferable to use each of the pyramidal mirror and the rotary single mirror as the optical deflector in which there is almost no practical problem about the inclination of the deflecting reflecting face.

In a second structure of the present invention, the position of the cylindrical lens system is set such that the linear image extending in the main scan-corresponding direction is formed in the vicinity of the deflecting reflecting face of the optical deflector. The image forming mirror system is constructed such that positions of the deflecting reflecting face and the scanned face are approximately set in a conjugate relation in geometrical optics with respect to the cross scan-corresponding direction.

The optical scanner having the second structure of the present invention has a function for correcting an inclination of the deflecting reflecting face. Accordingly, it is possible to freely use a rotary polygon mirror having an inclined reflecting face, etc. as the optical deflector. In the optical scanner having the second structure, the position of the cylindrical lens system is set such that the linear image extending in the main scan-corresponding direction is formed in the vicinity of the deflecting reflecting face of the optical deflector. Such constructional contents mean that a reference position of an arranged cylindrical lens is set such that the linear image extending in the main scan-corresponding direction is formed in the vicinity of the deflecting reflecting face of the optical deflector. The position of the cylindrical lens can be adjusted by displacing the cylindrical lens in an optical axis direction in the vicinity of such a set reference position.

The image forming mirror system can be constructed by various kinds of structures. For example, the image forming mirror system can be constructed by combining a concave spherical mirror and an elongated concave cylindrical mirror with each other. In accordance with a third structure of the present invention, the image forming mirror system is constructed by an anamorphic single concave mirror having a reflecting face formed by an aspherical surface.

In accordance with a fourth structure of the present invention, the light beam incident to the deflecting reflecting face of the optical deflector is convergent in the main scan-corresponding direction. In accordance with a fifth structure of the present invention, the light beam incident to the deflecting reflecting face of the optical deflector is divergent in the main scan-corresponding direction. In accordance with a sixth structure of the present invention, the light beam emitted from the light source device is set to a parallel light beam such that the light beam incident to the deflecting reflecting face is parallel to the main scan-corresponding direction.

In the optical scanner of the present invention, the light beam from the light source device is focused and formed by the cylindrical lens system as a linear image extending in the main scan-corresponding direction. The deflected light beam is converged by the image forming mirror system as a light spot on the scanned face. Accordingly, with respect to the cross scan-corresponding direction, the light spot constitutes an image formed by the image forming mirror system with the above linear image as an object point.

$\beta$ is set to a lateral magnification of the image formed by the image forming mirror system in the cross scan-corresponding direction. When a forming position of the linear image is displaced by a distance $\Delta$ on an optical path of the light beam, the position of the image formed by the image forming mirror system in the cross scan-corresponding direction is displaced by $\beta^2\Delta$. Accordingly, the position of the image formed by the image forming mirror in the cross scan-corresponding direction can be shifted in a direction perpendicular to the scanned face by displacing an arranging position of the cylindrical lens system in the optical axis direction. Further, no forming state of the image formed by the image forming mirror system in the main scan-corresponding direction is changed even when the cylindrical lens system is displaced in the optical axis direction.

In the second structure of the optical scanner, the forming position of the linear image is located in the vicinity of the deflecting reflecting face. Accordingly, no position of the light spot in the cross scan-corresponding direction is substantially influenced by the inclination of the deflecting reflecting face.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical scanner in the present invention will now be described in detail with reference to the accompanying drawings.

Figure 1A:
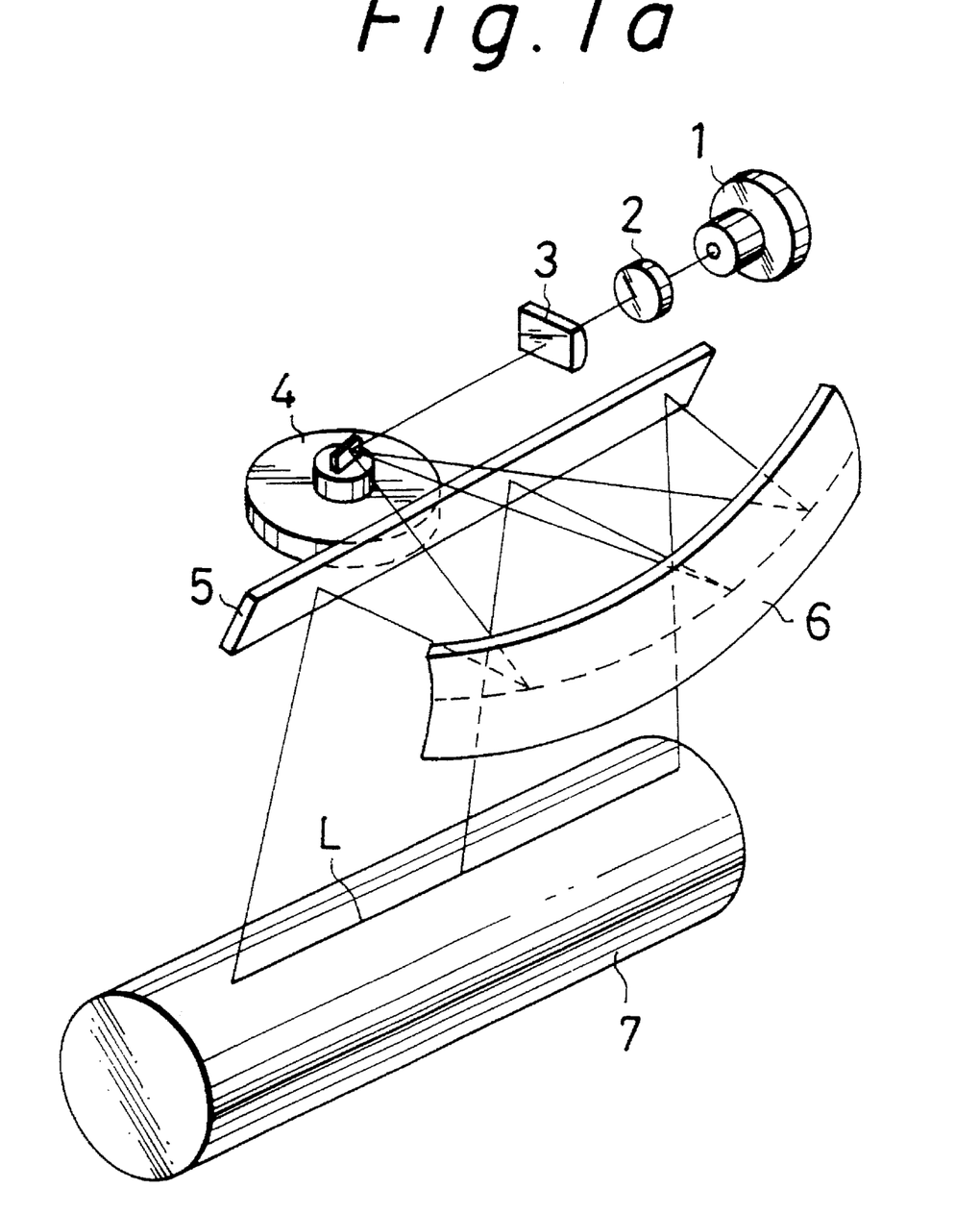
FIGS. 1a to 1d are views for explaining an optical scanner in accordance with one embodiment of the present invention.

In FIG. 1a, a divergent light beam from a semiconductor laser 1 as a light source is transmitted through a coupling lens 2. The coupling lens 2 changes the transmitted light beam to a convergent or divergent light beam. Otherwise, the coupling lens 2 may substantially change the transmitted light beam to a parallel light beam. In this embodiment, the coupling lens 2 substantially changes the transmitted light beam to a parallel light beam. The semiconductor laser 1 and the coupling lens 2 constitute a light source device.

Subsequently, the light beam emitted from the light source device is transmitted through a cylindrical lens 3 as a linear image forming element and is converged only in a cross scan-corresponding direction. The light beam is then formed as a linear image extending in a main scan-corresponding direction in the vicinity of a deflecting reflecting face of an optical deflector 4 as a rotary single mirror. The light beam reflected on the deflecting reflecting face is reflected on an image forming mirror system 6 and is further reflected on an elongated mirror 5. Thus, the light beam is converged as a light spot on a photoconductive photosensitive body 7 arranged such that a generating line of the photosensitive body 7 is in conformity with a main scanning line L on a scanned face. The photosensitive body 7 is optically scanned at an equal speed as the light beam is deflected by the optical deflector 4 at an equal angular velocity. The elongated mirror 5 is disposed to bend an optical path of the light beam and has no refracting power. Accordingly, no elongated mirror 5 constitutes the image forming mirror system.

An image forming operation of the image forming mirror system 6 is performed as follows with respect to the main scan-corresponding direction and the cross scan-corresponding direction. Namely, with respect to the main scan-corresponding direction, the parallel light beam transmitted through the coupling lens 2 is converged by the image forming mirror system 6 as a light spot on the photosensitive body 7. With respect to the cross scan-corresponding direction, an image formed by the image forming mirror system 6 is formed as the light spot on the photosensitive body 7 in a state in which an object point is provided as a linear image extending in the main scan-corresponding direction and formed as an image by the cylindrical lens 3 as mentioned above. In this embodiment, the linear image is formed as an image in the vicinity of the deflecting reflecting face. Accordingly, with respect to the cross scan-corresponding direction, the image forming mirror system 6 approximately sets positions of the deflecting reflecting face and the scanned face in a conjugate relation in geometrical optics.

Figure 1B:
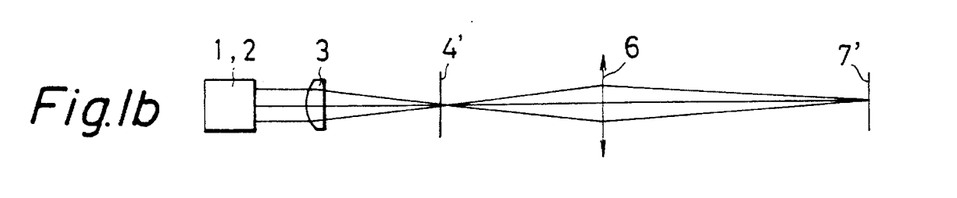
Figures 1C, 1D:
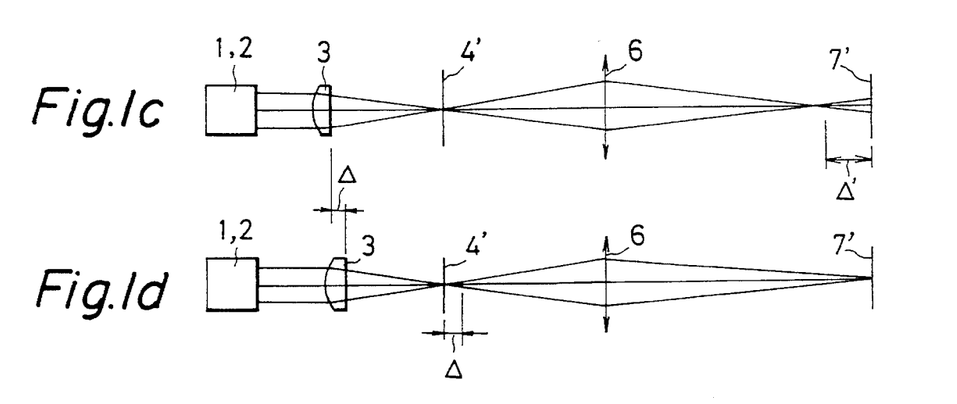

FIG. 1*b* shows this optical arranging state. Reference numerals 4' and 7' respectively designate the deflecting reflecting face of the optical deflector 4 and the scanned face. FIG. 1*c* shows a state in which a position of the image formed by the image forming mirror system 6 in the cross scan-corresponding direction is shifted by a distance Δ' in a direction perpendicular to the scanned face 7' by errors in manufacture and assembly of the image forming mirror system 6. In this case, when β is set to a lateral magnification of the image formed by the image forming mirror system 6 in the cross scan-corresponding direction and the cylindrical lens 3 is moved onto a side of the deflecting reflecting face 4' by a distance Δ satisfying the relation Δ'=β²Δ, a forming position of the linear image is also moved by the distance Δ as shown in FIG. 1*d*. Thus, the position of the image formed by the image forming mirror system 6 in the cross scan-corresponding direction can be conformed to the scanned face 7' as they are designed.

Figure 2A:
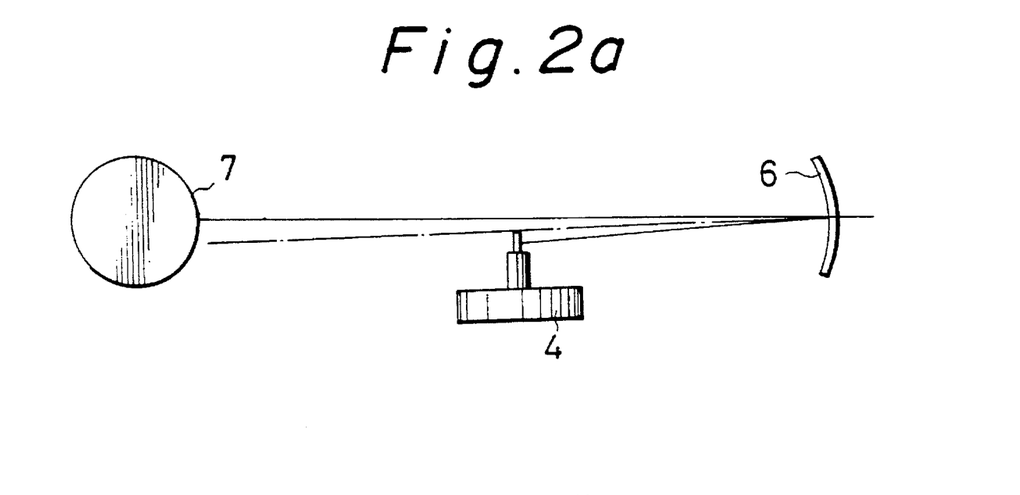
FIGS. 2a to 2c are views showing three examples of an optical arrangement from an optical deflector to a scanned face.
Figure 2B:
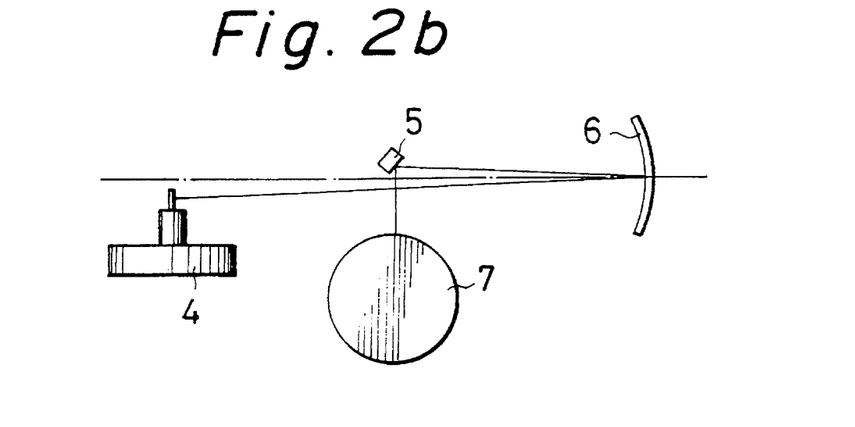
Figure 2C:
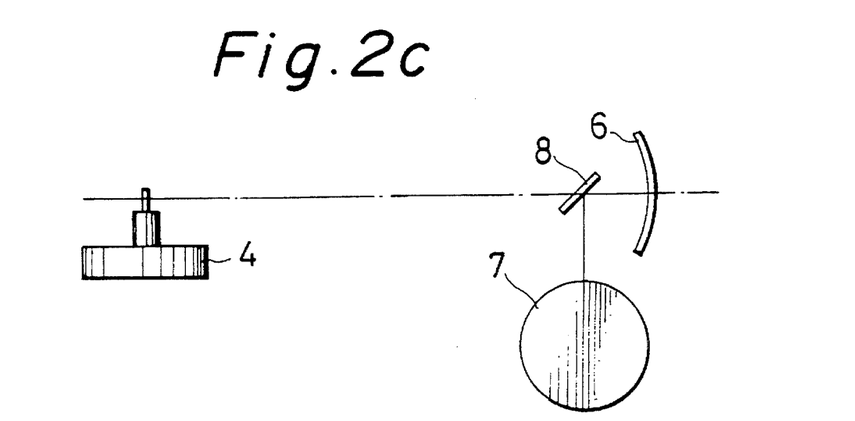

In the optical scanner using the image forming mirror system, the deflected light beam is reflected by the image forming mirror system on an incident side of the optical scanner. Accordingly, it is necessary to separate an optical path of the reflected light beam from an optical path of the incident light beam. It is possible to use various kinds of methods for separating these optical paths from each other. FIGS. 2*a* to 2*c* show three typical examples of these separating methods. FIGS. 2*a* and 2*b* show an optical path separating system in which the light beam incident to the image forming mirror system 6 is inclined in the cross scan-corresponding direction set to a vertical direction. In FIG. 2*a*, the light beam reflected on the image forming mirror system 6 is directly incident to the photosensitive body 7. In FIG. 2*b*, an optical path of the reflected light beam is bent by the elongated mirror 5 and is guided to the photosensitive body 7. This optical arrangement shown in FIG. 2*b* is used in the optical scanner shown in FIG. 1. FIG. 2*c* shows a system for separating the above optical paths from each other by using an elongated half mirror 8.

In the optical path separating systems shown in FIGS. 2*a* and 2*b*, the locus of an incident position of the deflected light beam incident to the image forming mirror system 5 is not parallel to the main scan-corresponding direction set to a direction perpendicular to a paper face in FIG. 2, but is curved. Therefore, in such optical path separating systems, a main scanning line on the scanned face is curved. However, this curve in the main scanning line can be reduced by the following reducing methods to such an extent that there are no practical problems about this curve. Namely, in these reducing methods, an optical axis of the image forming mirror system 6 is slightly inclined in the cross scan-corresponding direction, or is positioned by a slight parallel displacement of the image forming mirror system 6 in the cross scan-corresponding direction. Further, these parallel displacement and inclination of the image forming mirror system 6 may be combined with each other to reduce the above curve.

Figure 3:
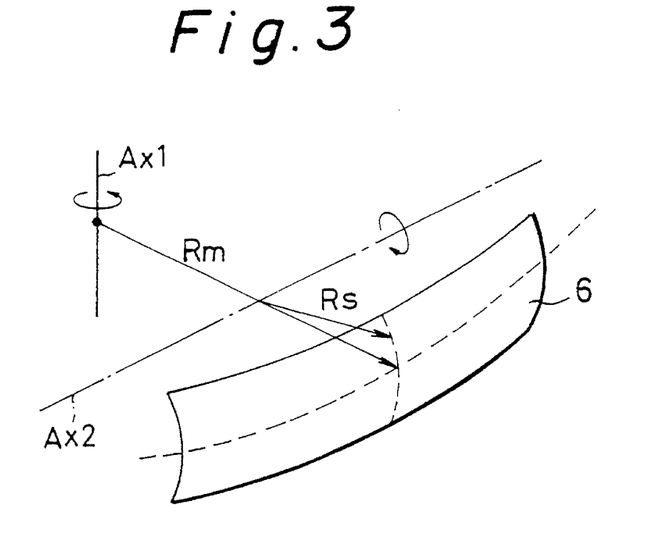
FIG. 3 is a view for explaining the shape of an aspherical surface constituting a reflecting face of an image forming mirror system 6 in the embodiment shown in FIGS. 1a to 1d.

FIG. 3 is a view for explaining a shape of the reflecting face of the image forming mirror system 6. The reflecting face of the image forming mirror system 5 is specified as follows. Namely, radii of curvature of the reflecting face corresponding to maximum and minimum curvatures are respectively set to Rs and Rm in the position of an intersecting point between the optical axis of the reflecting face of the image forming mirror system 6 and this reflecting face. These maximum and minimum curvatures relate to two symmetrical faces perpendicular to each other on the reflecting face. Namely, the two symmetrical faces include the optical axis of the reflecting face and are perpendicular to each other. The radius of curvature of an intersecting line between the reflecting face and one symmetrical face (which is temporarily called a maximum curvature symmetrical face) is equal to the above Rs at an intersecting point of the optical axis and the reflecting face. The radius of curvature of an intersecting line between the reflecting face and the other symmetrical face (which is temporarily called a minimum curvature symmetrical face) is equal to the above Rm at an intersecting point of the optical axis and the reflecting face.

The intersecting line of the reflecting face and the above minimum curvature symmetrical face is shown by a horizontal broken line in FIG. 3. In the following description, X is set to a coordinate in a direction of the optical axis and the above intersecting point is set to an origin. Further, Y is set to a coordinate in a direction perpendicular to the optical axis on the minimum curvature symmetrical face and K is set to a conical constant. In this case, the intersecting line of the reflecting face and the above minimum curvature symmetrical face is equal to a curve represented by the following formula (1).

$$X = Y^2/[Rm + \sqrt{\{Rm^2 - (1+K)Y^2\}}\ ] \tag{1}$$

In FIG. 3, axis Ax1 is an axis perpendicular to the minimum curvature symmetrical face in a position separated by the curvature radius Rm from the above intersecting point on the optical axis. Further, axis Ax2 is an axis perpendicular to the optical axis on the minimum curvature symmetrical face in a position separated by the curvature radius Rs from the above intersecting point.

The shape of the reflecting face of the image forming mirror system 6 is an anamorphic aspherical shape obtained by rotating the curve represented by the formula (1) (shown by a horizontal broken line in FIG. 3) around the axis Ax2. Therefore, this aspherical surface is a barrel type toric face. The image forming mirror system 6 is used in a state in which a direction of the axis Ax2 is parallel to the main scan-corresponding direction.

Figure 4:
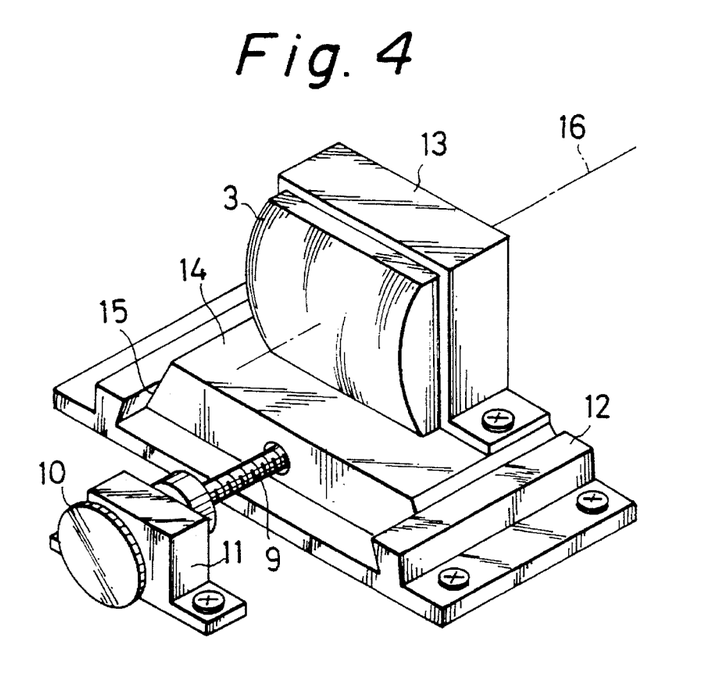
FIG. 4 is a perspective view showing one example of an adjusting mechanism for displacing and adjusting a cylindrical lens system.

FIG. 4 shows one example of a displacing adjusting mechanism for displacing and adjusting a cylindrical lens system 3 in the direction of an optical axis 15 of the optical scanner. The cylindrical lens system 3 is fixed onto a moving stage 14 by a fixing means 13. The moving stage 14 is fitted onto a groove 15 of a supporting body 12. The moving stage 14 can be displaced and adjusted by an adjusting screw 9 in the direction of the optical axis 16. The adjusting screw 9 is screwed into a screw receiver 11 fixedly disposed in a fixed member of the optical scanner. Accordingly, the cylindrical lens system 3 can be displaced and adjusted in the optical axis direction by rotating and adjusting a knob 10 of the adjusting screw 10.

Four concrete examples 1 to 4 of the optical arrangement of the optical scanner with respect to the above embodiment will next be explained.

Figure 5:
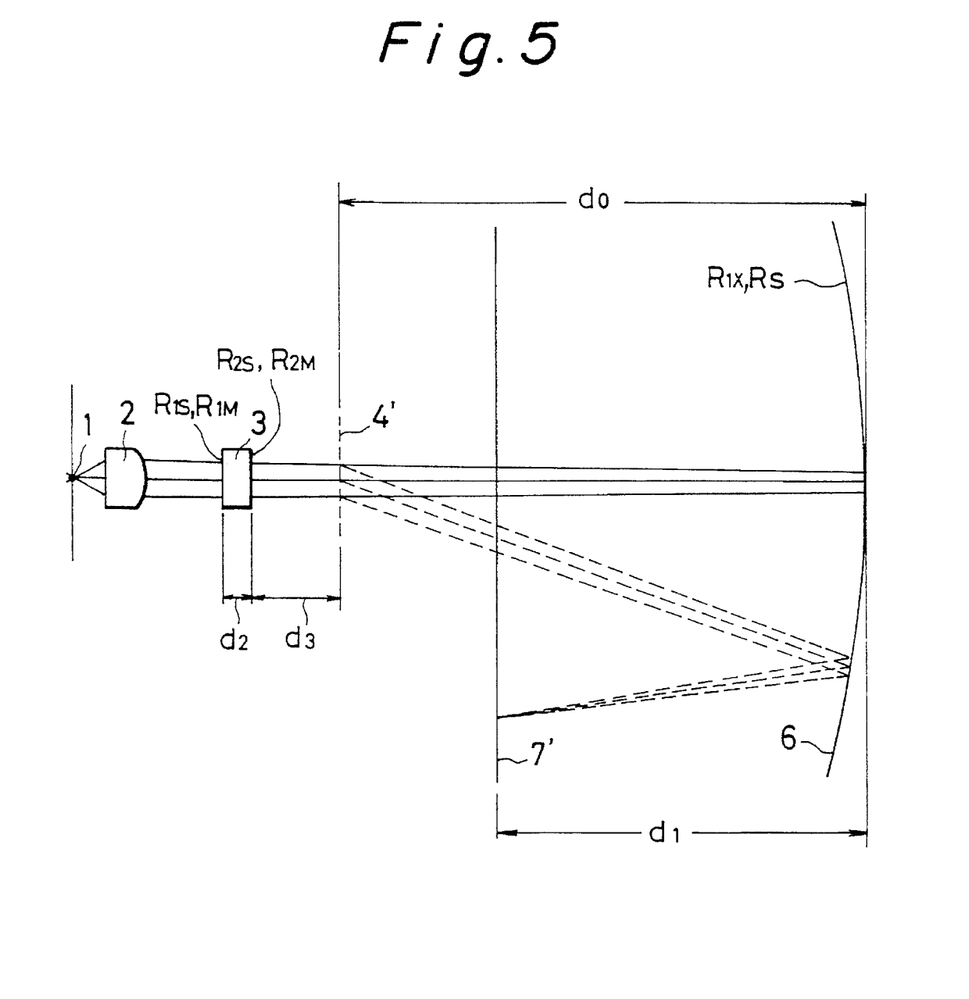
FIG. 5 is a view for explaining one concrete example of the optical scanner with respect to the above embodiment.

FIG. 5 shows a typical view showing an optical path from the light source I to the scanned face 7'. As shown in FIG. 5, in each of the concrete examples, $R_{1S}$ is set to a radius of curvature of a light source side lens face of the cylindrical lens system 3 in the main scan-corresponding direction. $R_{2S}$ is set to a radius of curvature of a deflecting reflecting side lens face of the cylindrical lens system 3 in the main scan-corresponding direction. $R_{1M}$ is set to a radius of curvature of the light source side lens face of the cylindrical lens system 3 in the cross scan-corresponding direction. $R_{2M}$ is set to a radius of curvature of the deflecting reflecting side lens face of the cylindrical lens system 3 in the cross scan-corresponding direction. Rm is set to a radius of curvature of the reflecting face of the image forming mirror system 5 on the optical axis with respect to the main scan-corresponding direction. K is set to a conical constant. Rs is set to a radius of curvature of the reflecting face of the image forming mirror system 6 on the optical axis with respect to the cross scan-corresponding direction. $d_0$ is set to a distance from the deflecting reflecting face 4' to the reflecting face of the image forming mirror system 6. $d_1$ is set to a distance from the above reflecting face to the scanned face 7'. $d_2$ is set to a thickness of the cylindrical lens system 3. Reference numeral n is set to a refractive index of the cylindrical lens system 3. Further, $d_3$ is set to a distance between the cylindrical lens system 3 and the deflecting reflecting face 4'.

$S_0$ shows the position of an object point provided when an image is formed by the image forming mirror system 6 in the main scan-corresponding direction. Namely, $S_0$ designates a distance from the reflecting face to the position of the object point. $S_0$ is negative when this object point is located on this side of the reflecting face, i.e., the light source side on an optical path of light. In all the concrete examples, an angle of deflection of light deflected by the optical deflector 4 is set to ±50 degrees and a focal length of the image forming mirror system 6 with respect to the main scan-corresponding direction is normalized to 100.

In a first concrete example 1, a light beam emitted from the coupling lens 3 is convergent. This convergent light beam is incident to the deflecting reflecting face as it is with respect to the main scan-corresponding direction. At this time, the above object point is a natural convergent point of this convergent light beam at which the light beam is naturally converged on the optical path without any influence of the other optical systems on the light beam. In the concrete example 1, the above $S_0$ is positive since the object point is located after the image forming mirror system 6.

CONCRETE EXAMPLE 1

| $R_{1M} = \infty$ | $R_{1S} = 19.468$ | $d_2 = 3.632$ | n = 1.51118 |
|---|---|---|---|
| $R_{2M} = \infty$ | $R_{2S} = \infty$ | $d_3 = 32.228$ | |
| $S_0 = 285.769$ | | $d_0 = 60.385$ | |
| Rm = −200 | Rs = −66.830 | $d_1 = 74.077$ | K = −0.4 |

Figure 6A:
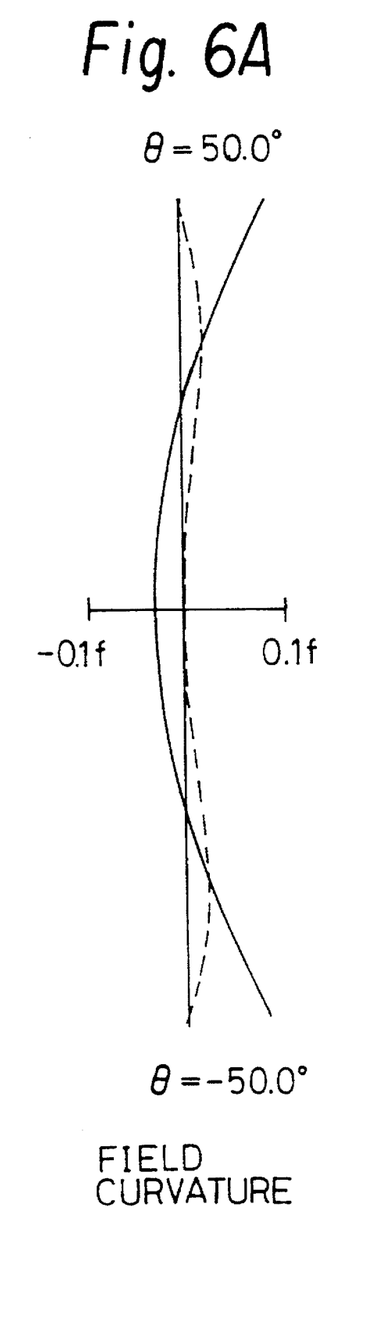
FIG. 6 is diagrams showing field curvature and scanning characteristics of the optical scanner with respect to Concrete example 1.
Figure 6B:
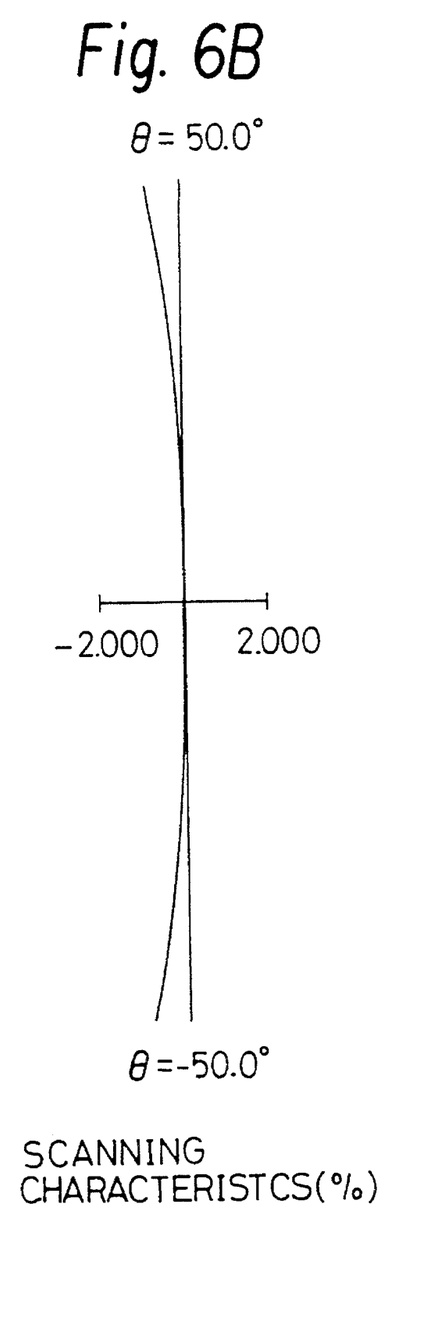

FIG. 6 shows field curvature and scanning characteristics of the optical scanner. In the left-hand field curvature diagram of FIG. 6, broken and solid lines respectively show field curvatures in the main scan-corresponding direction and the cross scan-corresponding direction. The scanning characteristics are defined by the following formula,

[{Hr(θ)/Hi(θ)}−1]×100 (%)

when the height of an ideal image at an angle θ of deflection of light is set to Hi(θ) and a height of the actual image is set to Hr(θ). The scanning characteristics correspond to fθ characteristics defined with respect to an fθ lens. In FIG. 6, $f_M$ designates a combined focal length of an image forming reflecting mirror for an equal speed scan on a deflecting scanning face.

Figure 7:
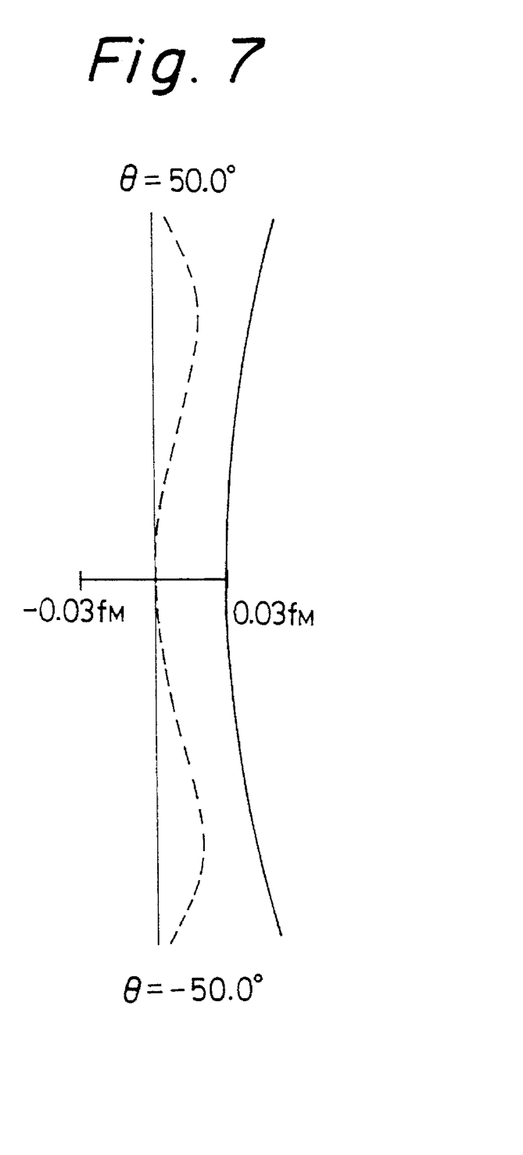
FIG. 7 is a diagram of field curvature when an error in manufacture of an image forming mirror system is caused in the Concrete example 1.
Figure 8:
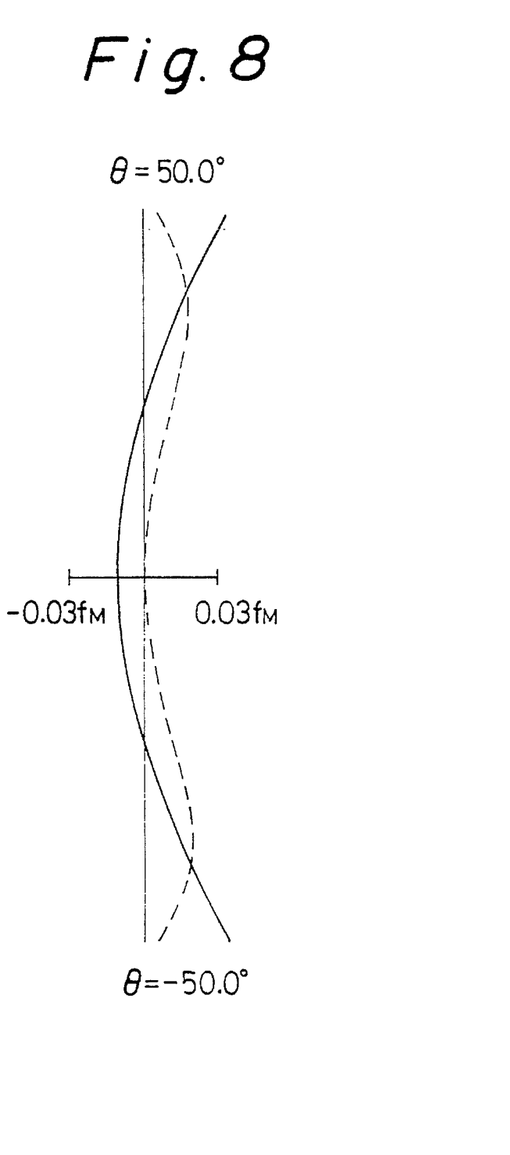
FIG. 8 is a diagram showing correction of the field curvature in FIG. 7 by displacing the cylindrical lens system.

FIG. 7 shows field curvature of the optical scanner when Rs is set to −65.377 by an error in manufacture of the image forming mirror system 6 in the concrete example 1. The position of an image formed in the cross scan-corresponding direction is moved by this error in manufacture in an optical axis direction so that image forming performance is reduced. However, as shown in FIG. 8, designed image forming performance can be approximately obtained by displacing the cylindrical lens system 3 in the optical axis direction to adjust the position of a formed linear image. At this time, $d_3$ is equal to 29.686 and the cylindrical lens system 3 is displaced by 2.592 toward the deflecting reflecting face.

CONCRETE EXAMPLE 2

| $R_{1M} = \infty$ | $R_{1S} = 20.655$ | $d_2 = 3.854$ | n = 1.51118 |
|---|---|---|---|
| $R_{2M} = \infty$ | $R_{2S} = \infty$ | $d_3 = 35.324$ | |
| $S_0 = 498.960$ | | $d_0 = 65.973$ | |
| Rm = −200 | Rs = −75.530 | $d_1 = 83.305$ | K = −1.0 |

Figures 9A, 9B:
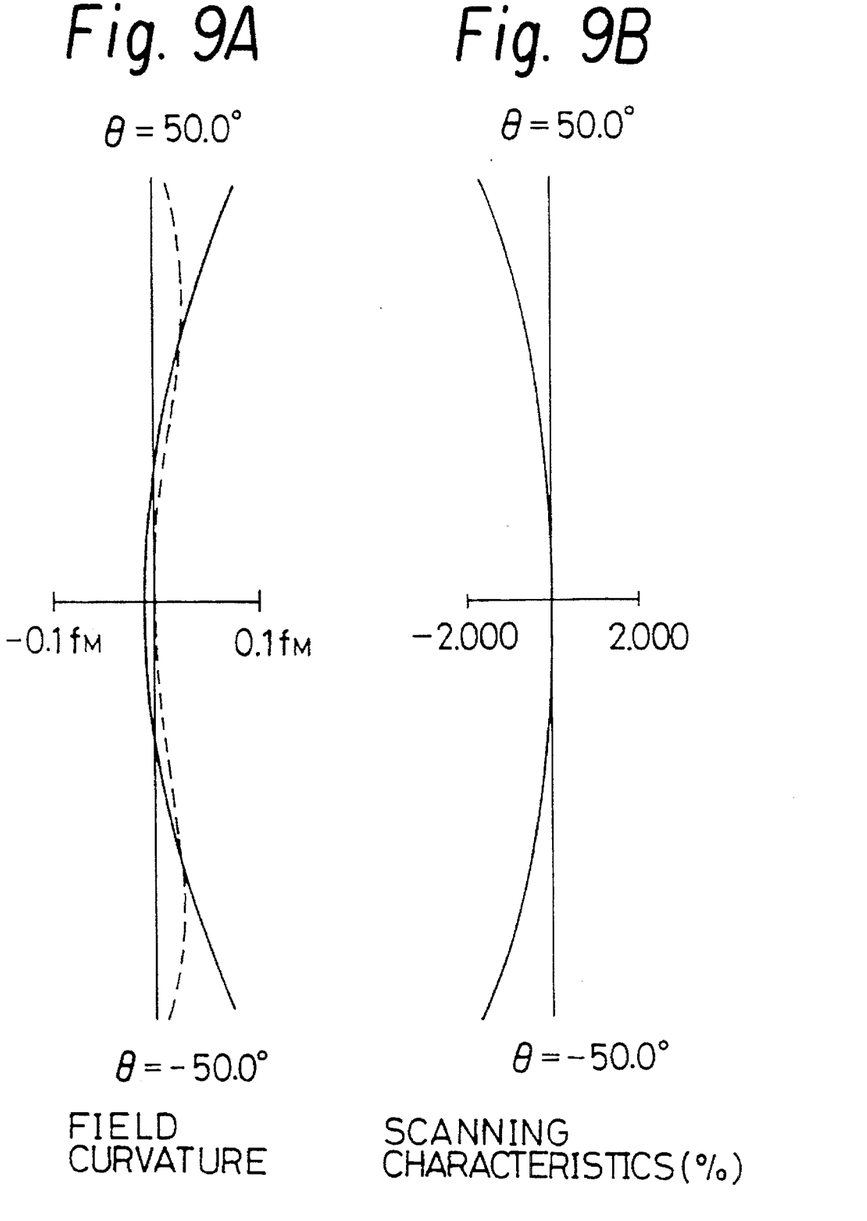
FIG. 9 is diagrams showing field curvature and scanning characteristics of the optical scanner in Concrete example 2.

In this concrete example 2, as clearly seen from the value of $S_0$, the deflected light beam is convergent with respect to the main scan-corresponding direction. FIG. 9 shows field curvature and scanning characteristics of the optical scanner in this concrete example 2.

CONCRETE EXAMPLE 3

| | | | |
|---|---|---|---|
| $R_{1M} = \infty$ | $R_{1S} = 21.278$ | $d_2 = 3.970$ | $n = 1.51118$ |
| $R_{2M} = \infty$ | $R_{2S} = \infty$ | $d_3 = 38.984$ | |
| $S_0 = \infty$ | | $d_0 = 63.517$ | |
| $Rm = -200$ | $Rs = -77.888$ | $d_1 = 100.126$ | $K = -0.5$ |

Figure 10A:
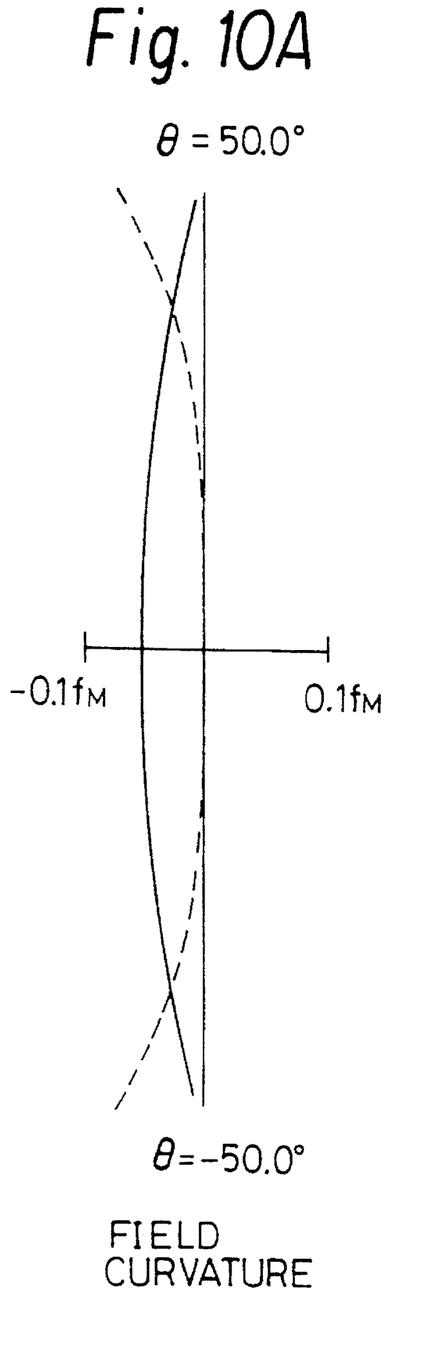
FIG. 10 is diagrams showing field curvature and scanning characteristics of the optical scanner in Concrete example 3.
Figure 10B:
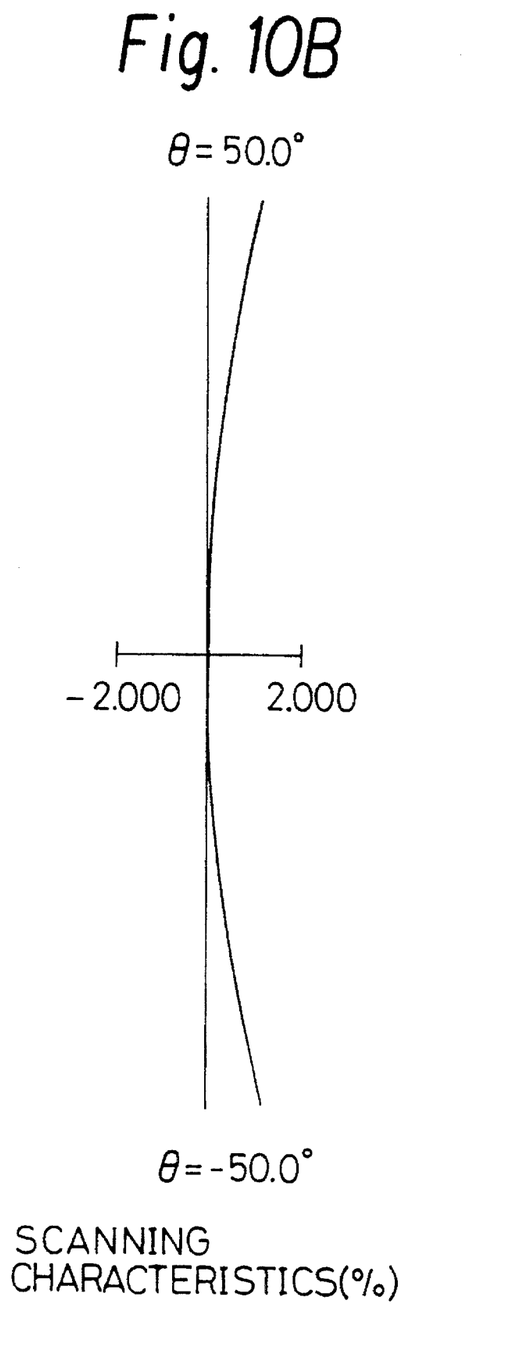

In this concrete example 3, as clearly seen from the value of $S_0$, the deflected light beam is parallel to the main scan-corresponding direction. FIG. 10 shows field curvature and scanning characteristics of the optical scanner in this concrete example 3.

CONCRETE EXAMPLE 4

| | | | |
|---|---|---|---|
| $R_{1M} = \infty$ | $R_{1S} = 21.922$ | $d_2 = 4.090$ | $n = 1.51118$ |
| $R_{2M} = \infty$ | $R_{2S} = \infty$ | $d_3 = 41.197$ | |
| $S_0 = 1959.100$ | | $d_0 = 61.350$ | |
| $Rm = -200$ | $Rs = -78.282$ | $d_1 = 105.379$ | $K = -0.9$ |

Figures 11A, 11B:
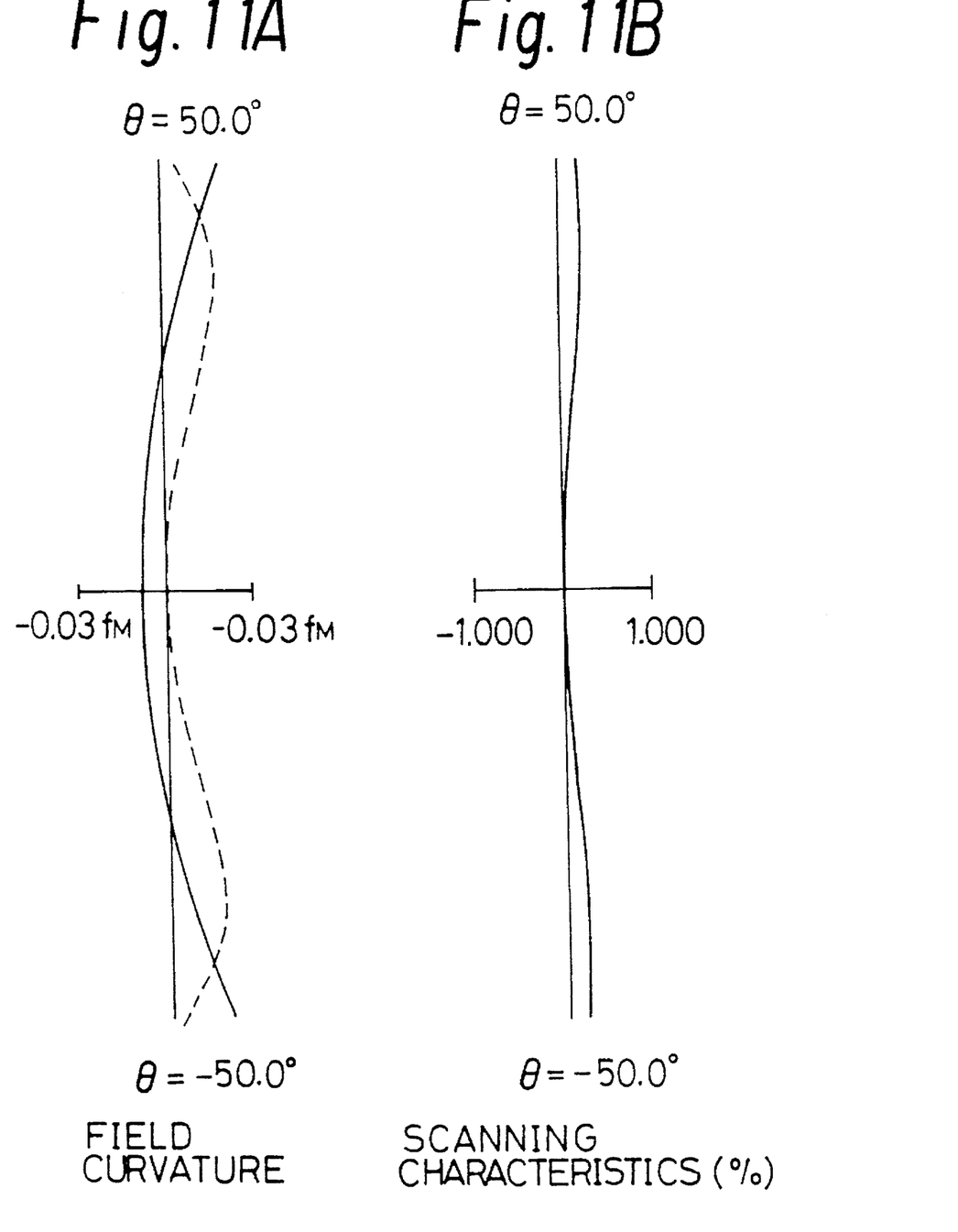
FIG. 11 is diagrams showing field curvature and scanning characteristics of the optical scanner in Concrete example 4.

In this concrete example 4, as clearly seen from the negative value of $S_0$, the deflected light beam is divergent with respect to the main scan-corresponding direction. An object point formed as an image by the image forming mirror system 6 with respect to the main scan-corresponding direction is a virtual divergent starting point of the divergent light beam emitted from the coupling lens 2. FIG. 11 shows field curvature and scanning characteristics of the optical scanner in this concrete example 4.

In these concrete examples 2 to 4, when the position of a formed image in the cross scan-corresponding direction is shifted by errors in manufacture and assembly of the image forming mirror system, designed field curvature and image forming characteristics can be approximately obtained as shown in FIG. 9 to 11 by displacing the cylindrical lens system 3 in the optical axis direction.

As mentioned above, in an optical scanner having a first structure of the present invention, it is possible to correct an error in diameter of a light spot in a cross scan-corresponding direction caused by errors in manufacture and assembly of an optical system. In an optical scanner having a second structure of the present invention, the above error in diameter of the light spot is corrected and the inclination of a deflecting reflecting face is corrected so that the generation of jitter can be prevented. In an optical scanner having a third structure of the present invention, aberrations can be preferably corrected by using an aspherical mirror surface. In an optical scanner having a fourth structure of the present invention, a distance between the deflecting reflecting face and an image forming mirror system can be set to be short so that the optical scanner can be made compact. In an optical scanner having a fifth structure of the present invention, the distance between the deflecting reflecting face and the image forming mirror system is increased so that it is easy to make a layout of the optical system and arrange this optical system. In an optical scanner having a sixth structure of the present invention, a distance between a light source device and a cylindrical lens system can be freely set so that it is easy to make a layout of the optical scanner.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
   a light source device for emitting a light beam for performing an optical scanning operation;
   a cylindrical lens system for converging the light beam from the light source device only in a cross scan-corresponding direction and focusing and forming the light beam as a linear image extending in a main scan-corresponding direction;
   an optical deflector for reflecting the light beam from this cylindrical lens system on a deflecting reflecting face and deflecting this light beam at an equal angular velocity;
   an image forming mirror system having an anamorphic single concave mirror for converging the deflected light beam as a light spot on a scanned face and performing the optical scanning operation at an equal speed by using said light spot, said anamorphic single concave mirror being formed by an aspherical surface; and
   an adjusting mechanism means for fixing said cylindrical lens system after displacing and adjusting a position of said cylindrical lens system in an optical axis direction thereof so as to correct an error of a diameter of said light spot in said cross scan-corresponding direction based on errors in manufacture and assembly of the image forming mirror system only when said cylindrical lens system is mounted and assembled.

2. An optical scanner as claimed in claim 1, wherein the position of the cylindrical lens system is set such that the linear image extending in the main scan-corresponding direction is formed in the vicinity of the deflecting reflecting face of the optical deflector; and
   the image forming mirror system is constructed such that positions of the deflecting reflecting face and the scanned face are approximately set in a conjugate relation in geometrical optics with respect to the cross scan-corresponding direction.

3. An optical scanner as claimed in claim 1, further comprising a coupling lens and wherein the light beam incident to the deflecting reflecting face of the optical deflector passes through the coupling lens to be convergent in the main scan-corresponding direction.

4. An optical scanner as claimed in claim 1, wherein the light beam incident to the deflecting reflecting face of the optical deflector from said light source device through said cylindrical lens system is divergent in the main scan-corresponding direction.

5. An optical scanner as claimed in claim 1, wherein the light beam emitted from the light source device is a parallel light beam.

* * * * *